US009241254B2

(12) United States Patent
Yang

(10) Patent No.: US 9,241,254 B2
(45) Date of Patent: Jan. 19, 2016

(54) METHOD AND SYSTEM FOR DETERMINING REACHABILITY OF TERMINAL GROUP

(75) Inventor: Kun Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/366,431

(22) PCT Filed: Feb. 22, 2012

(86) PCT No.: PCT/CN2012/071471
§ 371 (c)(1),
(2), (4) Date: Jun. 18, 2014

(87) PCT Pub. No.: WO2013/107074
PCT Pub. Date: Jul. 25, 2013

(65) Prior Publication Data
US 2015/0156624 A1 Jun. 4, 2015

(30) Foreign Application Priority Data
Jan. 17, 2012 (CN) .......................... 2012 1 0015373

(51) Int. Cl.
*H04W 8/04* (2009.01)
*H04W 68/00* (2009.01)
(Continued)

(52) U.S. Cl.
CPC ................ *H04W 8/04* (2013.01); *H04W 4/005* (2013.01); *H04W 4/08* (2013.01); *H04W 8/186* (2013.01);
(Continued)

(58) Field of Classification Search
CPC ..... H04W 8/04; H04W 4/08; H04W 28/0289; H04W 12/08; H04W 8/186; H04W 4/005; H04W 68/00; H04W 8/10
See application file for complete search history.

(56) References Cited

U.S. PATENT DOCUMENTS 8,391,899 B2 * 3/2013 Cai et al. .......................... 455/466
2004/0180654 A1 * 9/2004 Chen .............................. 455/433
(Continued)

FOREIGN PATENT DOCUMENTS

CN 102083062 A 6/2011
CN 102143562 A 8/2011
CN 102202394 A 9/2011

OTHER PUBLICATIONS

International Search Report in international application No. PCT/CN2012/071471, mailed on Oct. 25, 2012.
(Continued)

*Primary Examiner* — Nathan Mitchell
(74) *Attorney, Agent, or Firm* — Oppedahl Patent Law Firm LLC

(57) ABSTRACT

A method and system for determining reachability of a terminal group are disclosed. The method includes that: when a service network element needs to acquire reachability of a terminal group, the service network element sends a terminal group reachability notification request message to a Home Subscriber Server (HSS), wherein the terminal group reachability notification request message includes information of the terminal group; and when the HSS determines that the terminal group is reachable, the HSS notifies the service network element that the terminal group is reachable. In the disclosure, the reachability of a Machine Type Communication (MTC) terminal group may be directly determined, so that it is unnecessary to determine the reachability of all terminals in the terminal group one by one, thereby saving network processing resources and alleviating network congestion.

16 Claims, 2 Drawing Sheets

(51) Int. Cl.
*H04W 4/00* (2009.01)
*H04W 8/18* (2009.01)
*H04W 12/08* (2009.01)
*H04W 28/02* (2009.01)
*H04W 8/10* (2009.01)
*H04W 4/08* (2009.01)

(52) U.S. Cl.
CPC .......... *H04W 12/08* (2013.01); *H04W 28/0289* (2013.01); *H04W 68/00* (2013.01); *H04W 8/10* (2013.01)

(56) References Cited

U.S. PATENT DOCUMENTS

2010/0261490 A1\* 10/2010 Berry et al. ................... 455/466
2012/0115492 A1\* 5/2012 Liao .............................. 455/445
2012/0252518 A1\* 10/2012 Karampatsis et al. ........ 455/515
2014/0051466 A1\* 2/2014 Yu ................................ 455/466

OTHER PUBLICATIONS

English Translation of the Written Opinion of the International Search Authority in international application No. PCT/CN2012/071471, mailed on Oct. 25, 2012.
MTC device Reach ability for Device trigger mailed on Apr. 6, 2011.
System Improvements for Machine-Type Communications mailed on Dec. 2, 2011.
Update of 23.204 for SMS 1-12 over IP procedures for E-UTRAN mailed on Aug. 29, 2008.
Supplementary European Search Report in European application No. 12866223.6, mailed on Jul. 1, 2015.

\* cited by examiner

METHOD AND SYSTEM FOR DETERMINING REACHABILITY OF TERMINAL GROUP

TECHNICAL FIELD

The disclosure relates to technology for determining reachability of a terminal, and particularly to a method and system for determining reachability of a terminal group.

BACKGROUND

FIG. 1 is a structural diagram of a traditional cellular wireless communication system. As shown in FIG. 1, the cellular wireless communication system mainly includes a Core Network (CN), a Radio Access Network (RAN) and a terminal. The CN is responsible for a transaction for a non-access stratum, such as terminal position update, and is an anchor point for a user plane. The RAN includes base stations, or the base stations and a base station controller. The RAN is responsible for a transaction for an access stratum (such as management of radio resources). There may be physical or logical connections between the base stations according to a practical situation, e.g., the connection between a base station 1 and a base station 2 and the connection between the base station 1 and a base station 3 as shown in FIG. 1. In addition, each base station may be connected to one or more CN nodes. The terminal refers to a User Equipment (UE), and is one of various devices that may communicate with a cellular wireless communication network, e.g., a mobile phone or a laptop.

A Machine Type Communication (MTC) service refers to a service used for communication between machines. In the MTC service, there is no need of human participation and all communication is completed by machines independently. A machine terminal obtains data through a sensing device including a sensor, then reports the data to a mobile communication network through the communication module of the machine terminal and accesses a public data network via the mobile communication network. The MTC service may include applications such as logistics monitoring, safety monitoring, remote medical detection and remote meter reading. Data of the MTC service may be managed by a mobile communication operator or a specific server of a special MTC operator, and may be checked by an MTC subscriber or an MTC manager. In this process, a device which obtains data required for the service is a terminal.

A characteristic different from traditional mobile communication technology is introduced into the MTC service, e.g., the group-based MTC characteristic. When the group-based MTC characteristic is activated, a network can control, manage or charge an MTC terminal group according to requirements of an operator. In this way, the group-based MTC characteristic provides a simpler mode for controlling/updating/charging MTC terminals by taking groups as granularities, and reduces redundant signalings to avoid network congestion. When there are a large number of MTC terminals, the group-based MTC characteristic can further save network resources. All terminals in a group may be in the same region, and/or be provided with the same MTC properties and attributes, and/or belong to the same MTC subscriber. With regard to a network, all terminals in the group are visible.

For the group-based MTC characteristic, when an MTC subscriber subscribes a terminal group, the operator needs to set and activate the group characteristic in subscription information of all terminals in the group, and stores the set subscription information of all terminals into a Home Subscription Server (HSS). Here, the HSS is an entity which is responsible for storing identity information, authentication information, authorization information and the like of a user or a terminal in a telecom network. According to different conditions, the HSS may be configured to store the identity information of the user and binding information of the user and the terminal, or may only store the identity information of the user, or may only store the identity information of the terminal. Here, the binding information of the user and the terminal may be stored by a Gateway (GW) when the HSS only stores the identity information of the user. In addition, the HSS is further responsible for a subscription database of a user, user identity authentication and authorization and the like. A service platform may inquire subscription information of the user or the terminal device from the HSS.

When a terminal is attached to a network, a Mobility Management Entity (MME) acquires the subscription information of the terminal from the HSS and stores the subscription information locally. The MME is an entity for managing control signalings of terminals in a CN, and is responsible for access control. The access control includes authentication control, identity assignment, user identity and device identity authentication, encryption for a signaling plane, protection of consistency with an Evolved Node B (eNB), conversion of safety parameters and Quality of Service (QoS) parameters between 2G/3G and Evolved Packet Systems (EPSs), access permission control, determination of whether to be able to acquire and reserve requested resources, legal interception, mobility management, session management, related operations for EPS bearers, network element selection and the like. The identity assignment refers to assignment of Globally Unique Temporary Identity (GUTI), Tracking Area Identity (TAI) list and the like. The mobility management may specifically refer to implementation of tracking and recording of the current location of a UE and the like.

In existing technologies, a terminal reachability notification request procedure (UE Reachability Notification Request Procedure) and a terminal activity notification procedure (UE Activity Notification Procedure) are defined in a terminal reachability procedure (UE Reachability Procedure), so as to implement network management for terminal reachability, namely, the reachability of a terminal may be acquired by any service-related entity in a network.

However, existing network functions fail to control the terminal reachability procedure of a terminal group according to subscribed group information after the group-based MTC characteristic is introduced, such that network congestion may be caused when the reachability of a large number of MTC terminals in the terminal group are acquired simultaneously by any service-related entity.

SUMMARY

In view of this, the disclosure is intended to provide a method and system for determining reachability of a terminal group, so as to determine the reachability of the terminal group by taking the terminal group as a unit and to alleviate network congestion.

To this end, the technical solutions of the disclosure are implemented as follows.

A method for determining reachability of a terminal group includes:

when a service network element needs to acquire the reachability of the terminal group, the service network element sends a terminal group reachability notification request message to a Home Subscriber Server (HSS), wherein the terminal group reachability notification request message comprises information of the terminal group; and when the HSS determines that the terminal group is reachable, the HSS notifies the service network element that the terminal group is reachable.

Preferably, the operation that the HSS determines that the terminal group is reachable may include:

after the HSS receives the terminal group reachability notification request message, the HSS sets a terminal Group Reachability Request Parameter (GRRP) locally, and forwards the terminal group reachability notification request message to a Mobility Management Entity (MME);

after the MME receives the terminal group reachability notification request message from the HSS, the MME sets a terminal GRRP locally, and after the MME locally detects according to the information of the terminal group an activity event of a representative terminal of the terminal group, the MME sends a terminal group activity notification message to the HSS and locally cancels the terminal GRRP; and after the HSS receives an update location message of the representative terminal of the terminal group or the terminal group activity notification message from the MME, the HSS determines that the terminal group is reachable, and the HSS cancels the terminal GRRP locally.

Preferably, the operation that the HSS determines that the terminal group is reachable may include:

after the HSS receives the terminal group reachability notification request message, the HSS sets a terminal GRRP locally, and forwards the terminal group reachability notification request message to the MME; and after the MME receives the terminal group reachability notification request message from the HSS, when the MME locally detects, according to the information of the terminal group, that a Paging Proceed Flag (PPF) of a representative terminal of the terminal group has not been cancelled, the MME determines that the terminal group is reachable, and the MME notifies the HSS that the terminal group is reachable; and after the HSS receives the notification that the terminal group is reachable, the HSS cancels the terminal GRRP locally; or when the MME detects that the PPF of the representative terminal of the terminal group has been cancelled, the MME sets a terminal GRRP locally, and after the MME locally detects an activity event of the representative terminal of the terminal group according to the information of the terminal group, the MME sends a terminal group activity notification message to the HSS and locally cancels the terminal GRRP; and after the HSS receives an update location message of the representative terminal of the terminal group or the terminal group activity notification message from the MME, the HSS determines that the terminal group is reachable, and the HSS cancels the terminal GRRP locally.

Preferably, the operation that the HSS determines that the terminal group is reachable may include:

after the HSS receives the terminal group reachability notification request message, when the HSS locally detects, according to the information of the terminal group, that a PPF of a representative terminal of the terminal group has not been cancelled, the HSS determines that the terminal group is reachable; or when the HSS detects that the PPF of the representative terminal of the terminal group has been cancelled, the HSS sets a terminal GRRP locally, and forwards the terminal group reachability notification request message to the MME; after the MME receives the terminal group reachability notification request message from the HSS, the MME sets a terminal GRRP locally, and when the MME locally detects, according to the information of the terminal group, that the PPF of the representative terminal of the terminal group has been set, the MME notifies the HSS of the PPF of the representative terminal of the terminal group and locally cancels the terminal GRRP; and after the HSS locally detects that the PPF of the representative terminal of the terminal group has been set or the HSS receives an update location message of the representative terminal of the terminal group, the HSS determines that the terminal group is reachable, and the HSS locally cancels the terminal GRRP.

Preferably, the information of the terminal group may include a terminal group identity and/or a set of terminal identities of terminals in the terminal group, and the service network element may be an Internet Protocol-Short Message-GW (IP-SM-GW), a Machine Type Communication-Inter Working Function (MTC-IWF) entity or a Machine Type Communication (MTC) server.

Preferably, the representative terminal of the terminal group may be designated by an operator or be agreed by an MTC subscriber and the operator.

Preferably, the activity event of the representative terminal of the terminal group may include: the representative terminal of the terminal group sends an attach request message when initiating a network attach process, or a Serving GW (S-GW) notifies the MME that the representative terminal of the terminal group is handed over to a non-$3^{rd}$Generation Partnership Project (3GPP) system.

A system for determining reachability of a terminal group includes a service network element and an HSS, wherein the service network element is configured to, when the service network element needs to acquire the reachability of the terminal group, send a terminal group reachability notification request message to the HSS, wherein the terminal group reachability notification request message comprises information of the terminal group; and the HSS is configured to, when the HSS determines that the terminal group is reachable, notify the service network element that the terminal group is reachable.

Preferably, the system may further include an MME, configured to: after the MME receives the terminal group reachability notification request message from the HSS, set a terminal Group Reachability Request Parameter (GRRP) locally; and after the MME locally detects an activity event of a representative terminal of the terminal group according to the information of the terminal group, send a terminal group activity notification message to the HSS and locally cancel the terminal GRRP;

wherein the HSS is further configured to: after the HSS receives the terminal group reachability notification request message, set a terminal GRRP locally and forward the terminal group reachability notification request message to the MME; and after the HSS receives an update location message of the representative terminal of the terminal group or the terminal group activity notification message from the MME, determine that the terminal group is reachable, and cancel the terminal GRRP locally.

Alternatively, the system may further include an MME, configured to: after the MME receives the terminal group reachability notification request message from the HSS, When the MME locally detects, according to the information of the terminal group, that a Paging Proceed Flag (PPF) of a representative terminal of the terminal group has not been cancelled, determine that the terminal group is reachable, and notify the HSS that the terminal group is reachable;

wherein the HSS is further configured to, after the HSS receives the notification that the terminal group is reachable, locally cancel the terminal GRRP; or when the MME detects that the PPF of the representative terminal of the terminal group has been cancelled, set a terminal GRRP locally, and after the MME locally detects an activity event of the representative terminal of the terminal group according to the information of the terminal group, send a terminal group activity notification message to the HSS and locally cancel the terminal GRRP;

wherein the HSS is further configured to, after the HSS receives the HSS receives the terminal group activity notification message sent by the MME or the update location message of the representative terminal of the terminal group, determine that the terminal group is reachable, and cancel locally the terminal GRRP; and wherein the HSS is further configured to, after the HSS receives the terminal group reachability notification request message, set a terminal GRRP locally and forward the terminal group reachability notification request message to the MME.

Alternatively, the system may further include an MME, wherein the HSS is further configured to: after the HSS receives the terminal group reachability notification request message, when the HSS locally detects, according to the information of the terminal group, that a PPF of a representative terminal of the terminal group has not been cancelled, determine that the terminal group is reachable; or when the HSS detects that the PPF of the representative terminal of the terminal group has been cancelled, set a terminal GRRP locally, and forward the terminal group reachability notification request message to the MME;

wherein the MME is further configured to: after the MME receives the terminal group reachability notification request message from the HSS, set a terminal GRRP locally, and when the MME locally detects, according to the information of the terminal group, that the PPF of the representative terminal of the terminal group has been set, notify the HSS of the PPF of the representative terminal of the terminal group and locally cancel the terminal GRRP;

wherein the HSS is further configured to: after the HSS locally detects that the PPF of the representative terminal of the terminal group has been set or the HSS receives an update location message of the representative terminal of the terminal group, determine that the terminal group is reachable, and locally cancel the terminal GRRP.

Preferably, the information of the terminal group may include a terminal group identity and/or a set of terminal identities of terminals in the terminal group, and the service network element may be an IP-SM-GW, an MTC-IWF entity or an MTC server.

In the disclosure, by storing group identity information of an MTC terminal group into an HSS, setting a representative terminal in the MTC terminal group and the like, a service-related network element may initiate a request for acquiring reachability of the terminal group to the HSS through the group identity information, and the HSS, or the HSS and an MME inquire(s), according to the group identity information of the MTC terminal group, whether the representative terminal in the MTC terminal group is reachable, so as to determine whether the whole MTC terminal group is reachable. With the disclosure, the reachability of the MTC terminal group may be determined directly, so that it is unnecessary to determine the reachability of all terminals in the terminal group one by one, thereby saving network processing resources and alleviating network congestion.

DETAILED DESCRIPTION

The basic idea of the disclosure is that: when a service network element needs to acquire the reachability of a terminal group, the service network element sends a terminal group reachability notification request message to an HSS, wherein the terminal group reachability notification request message includes information of the terminal group; and when the HSS determines that the terminal group is reachable, the HSS notifies the service network element that the terminal group is reachable.

To make the purpose, technical solutions and advantages of the disclosure to be clearer understood, the disclosure will be further elaborated below with reference to embodiments and the accompanying drawings.

Embodiment 1

Figure 1:
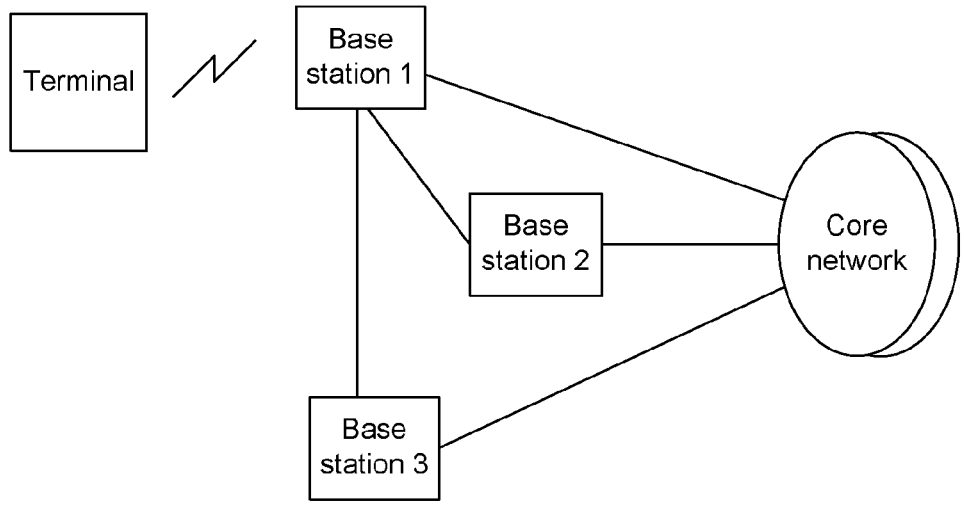
FIG. 1 is a structural diagram of a traditional cellular wireless communication system.
Figure 2:
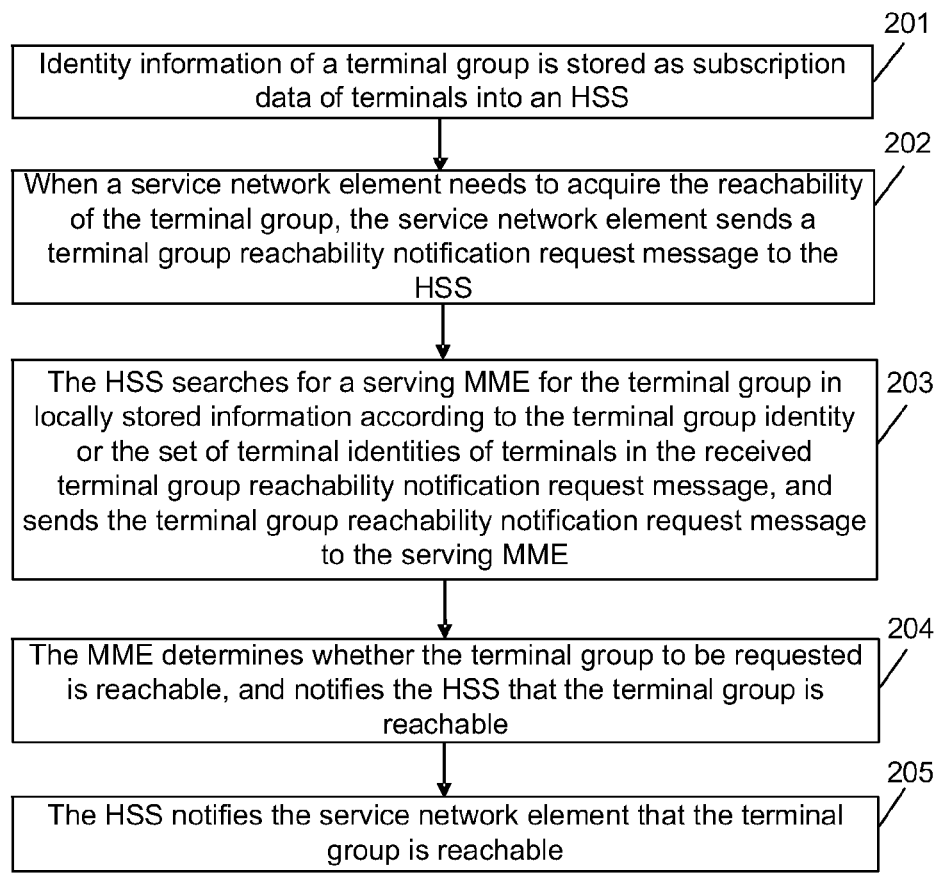
FIG. 2 is a flowchart of a method for determining reachability of a terminal group according to a first embodiment of the disclosure.

FIG. 2 is a flowchart of a method for determining reachability of a terminal group according to a first embodiment of the disclosure. As shown in FIG. 2, the method for determining reachability of a terminal group in this example specifically includes the following steps:

Step 201: Identity information of a terminal group is stored as subscription data of terminals into an HSS.

When a terminal accesses a network, a subscriber of the terminal group subscribes the terminals in the terminal group as terminals with a group characteristic, and a group identity is assigned by an operator for the terminal group and stored as the subscription data of the terminals into the HSS.

Step 202: When a service network element needs to acquire the reachability of the terminal group, the service network element sends a terminal group reachability notification request message to the HSS.

In this example, the service network element is an IP-SM-GW.

A multiple-to-one correspondence table between the terminal group identity and HSSs is stored into a local database of the IP-SM-GW. When the IP-SM-GW needs to acquire the reachability of the terminal group, the IP-SM-GW searches for, according to the terminal group identity and from the correspondence table between the terminal group identity and the HSSs stored in the local database, an HSS where the terminal group is located. After finding the HSS where the terminal group is located, the IP-SM-GW sends the terminal group reachability notification request message to the HSS. The terminal group reachability notification request message includes an address of the IP-SM-GW, and a terminal group identity and/or a set of terminal identities of terminals in the terminal group, e.g., an International Mobile Subscriber Identity (IMSI) set;

Step 203: The HSS searches for a serving MME for the terminal group in locally stored information according to the terminal group identity or the set of terminal identities of terminals in the received terminal group reachability notification request message, and sends the terminal group reachability notification request (GROUP-REACHABILITY-NO-TIFICATION-REQUEST) message to the serving MME.

After the terminal group registers to a network, the HSS may store a current serving MME for the terminal group. After the HSS receives the terminal group reachability notification request message from the IP-SM-GW, the HSS stores the address of the IP-SM-GW and locally sets a terminal group reachability request parameter (GRRP-MME) for the terminal group. At the same time, the HSS searches for the serving MME for the terminal group from the locally stored information according to the terminal group identity or the set of terminal identities of terminals in the terminal group reachability notification request message, and sends the terminal group reachability notification request (GROUP-REACH-ABILITY-NOTIFICATION-REQUEST) message to the MME. The terminal group reachability notification request message sent to the MME includes a GRRP-MME setting indicator.

Step 204: The MME determines whether the terminal group to be requested is reachable, and notifies the HSS that the terminal group is reachable.

After the MME receives the terminal group reachability notification request message from the HSS, the MME sets a GRRP-MME locally for the terminal group according to the indicator in the terminal group reachability notification request message, and simultaneously searches for group information of the terminals from locally stored information according to the terminal group identity or the set of terminal identities of terminals in the terminal group reachability notification request message. Wherein, the group information includes group identities of the terminals, and a group representative terminal identity (GRUEI, Group Representative UE Identity) and the like. In addition, after the MME detects an activity event of the representative terminal of the terminal group, the MME sends a terminal group activity notification (Group-Activity-Notification) message to the HSS to notify the HSS that the terminal group is reachable, and simultaneously cancels the GRRP-MME corresponding to the terminal group.

It needs to be noted that the representative terminal of the terminal group may be designated by an operator or may be also agreed by an MTC subscriber and the operator.

If the representative terminal of the terminal group is designated by the operator, the HSS may determine, through one or a combination of several of multiple following methods, whether a current terminal is the representative terminal of the terminal group:

taking the first attached terminal in the terminal group as the representative terminal of the terminal group;

taking the terminal with optimal performance in the terminal group as the representative terminal of the terminal group;

and taking the terminal with the strongest ability in the terminal group as the representative terminal of the terminal group.

If the representative terminal of the terminal group is agreed by the MTC subscriber and the operator, the terminal group identity and the set identity of the representative terminal of the terminal group are stored together in the HSS as subscription data of the terminals. Moreover, the MME obtains subscription data of a terminal from the HSS when the terminal is turned on and attached to the network.

Wherein, the activity event of the terminal includes that the terminal sends an attach request message when the terminal initiates a network attach process, or that a Serving Gateway (S-GW) notifies the MME that the terminal is handed over to a non-3GPP system.

Step 205: The HSS notifies the service network element that the terminal group is reachable.

After the HSS receives the terminal group activity notification message or an update location message of the representative terminal of the terminal group from the MME, the HSS sends the terminal group activity notification message to the IP-SM-GW to notify the IP-SM-GW that the terminal group is reachable, and locally cancels the GRRP-MME corresponding to the terminal group at the same time.

Embodiment 2

Figure 3:
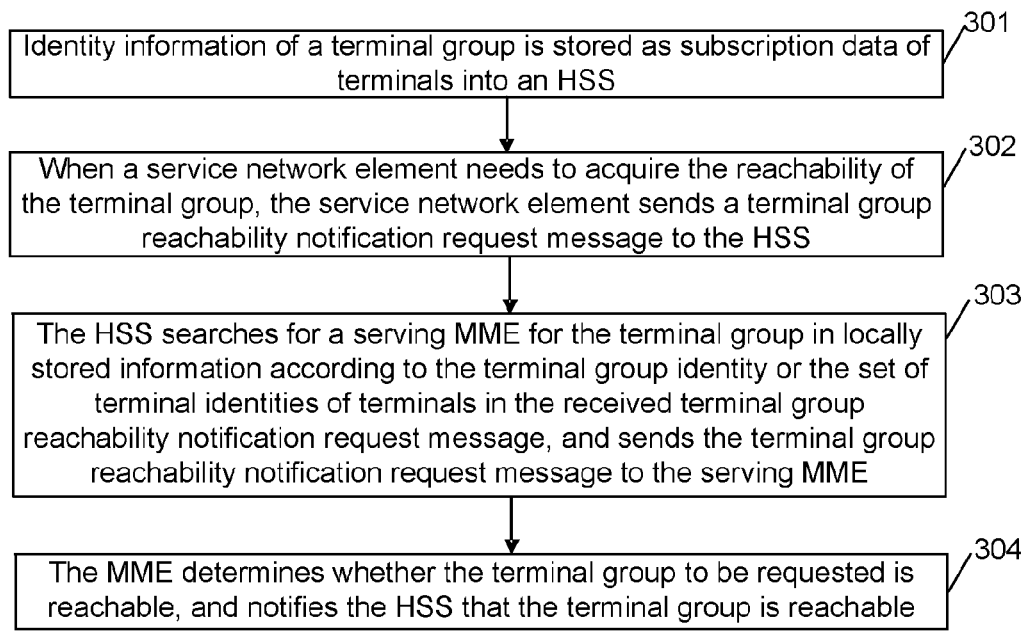
FIG. 3 is a flowchart of a method for determining reachability of a terminal group according to a second embodiment of the disclosure.

FIG. 3 is a flowchart of a method for determining reachability of a terminal group according to a second embodiment of the disclosure. As shown in FIG. 3, the method for determining reachability of a terminal group of this example specifically includes the following steps:

Step 301: Identity information of a terminal group is stored as subscription data of terminals into an HSS.

When a terminal accesses a network, a subscriber of the terminal group subscribes the terminals in the terminal group as terminals with a group characteristic, and a group identity is assigned by an operator for the terminal group and stored as the subscription data of the terminals into the HSS.

Step 302: When a service network element needs to acquire the reachability of the terminal group, the service network element sends a terminal group reachability notification request message to the HSS.

In this example, the service network element is an MTC-IWF entity.

A multiple-to-one correspondence table between a terminal group identity and HSSs is stored into a local database of the MTC-IWF. When the MTC-IWF needs to acquire the reachability of the terminal group, the MTC-IWF searches for, according to the terminal group identity and from the correspondence table between the terminal group identity and the HSSs stored in the local database, an HSS where the terminal group is located. After finding the HSS where the terminal group is located, the MTC-IWF sends the terminal group reachability notification request message to the HSS. The terminal group reachability notification request message includes an address of the MTC-IWF, and a terminal group identity and/or a set of terminal identities of terminals in the terminal group, e.g., an IMSI set.

Step 303: The HSS searches for a serving MME for the terminal group in locally stored information according to the terminal group identity or the set of terminal identities of terminals in the received terminal group reachability notification request message, and sends the terminal group reachability notification request message to the serving MME.

After the terminal group registers to a network, the HSS may store a current serving MME for the terminal group. After the HSS receives the terminal group reachability notification request message from the MTC-IWF, the HSS stores the address of the MTC-IWF and locally sets a GRRP-MME for the terminal group. At the same time, the HSS searches for the serving MME for the terminal group from the locally stored information according to the terminal group identity or the set of terminal identities of terminals in the terminal group reachability notification request message, and sends the terminal group reachability notification request message to the MME. The terminal group reachability notification request message sent to the MME includes a GRRP-MME setting indicator.

Step 304: The MME determines whether the terminal group to be requested is reachable, and notifies the HSS that the terminal group is reachable.

After the MME receives the terminal group reachability notification request message from the HSS, the MME searches for group information of the terminals, including group identities of the terminals and a GRUEI, from locally stored information according to the terminal group identity or the set of terminal identities of terminals in the terminal group reachability request message, and locally detects, according to subscribed group information, whether a PPF of the representative terminal of the terminal group has been cancelled. If the PPF of the representative terminal of the terminal group has been cancelled, the following Step A (including Step A1 and Step A2) is performed; if the PPF of the representative terminal of the terminal group has not been cancelled, the following Step B (including Step B1 and Step B2) is performed.

Step A1: The MME locally sets a GRRP-MME for the terminal group according to a indicator in the terminal group reachability notification request message, after detecting an activity event of the representative terminal of the terminal group, sends a terminal group activity notification message to the HSS to notify the HSS that the terminal group is reachable, and simultaneously cancels the GRRP-MME corresponding to the terminal group.

Step A2: After the HSS receives the terminal group activity notification message or an update location message of the representative terminal of the terminal group from the MME, the HSS sends the terminal group activity notification message to the MTC-IWF to notify the MTC-IWF that the terminal group is reachable, and simultaneously cancels the GRRP-MME corresponding to the terminal group.

Step B1: The MME directly sends the terminal group activity notification message to the HSS to notify the HSS that the terminal group is reachable.

Step B2: After the HSS receives the terminal group activity notification message from the MME, the HSS sends the terminal group activity notification message to the MTC-IWF to notify the MTC-IWF that the terminal group is reachable, and simultaneously cancels the GRRP-MME locally corresponding to the terminal group.

Wherein, the PPF of the terminal is configured to indicate whether the terminal can be paged. The PPF of the terminal is set after the MME locally detects the activity event of the terminal, and is cancelled after a locally-run terminal reachability timer of the MME expires.

Embodiment 3

Figure 4:
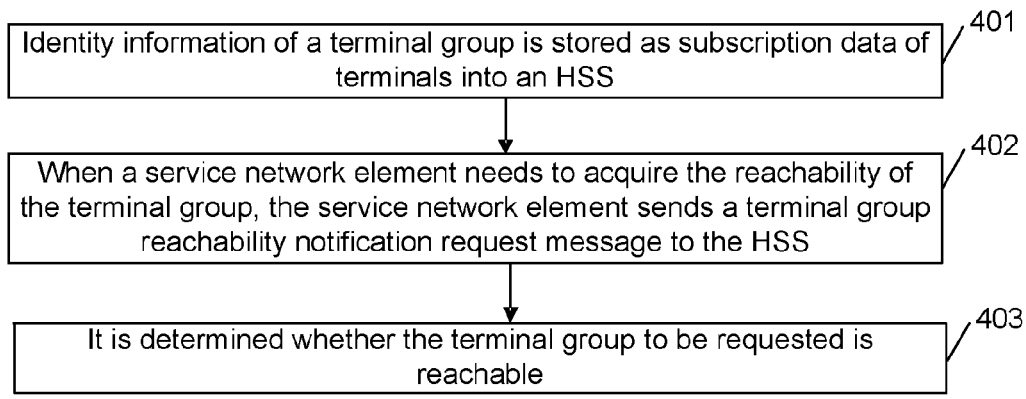
FIG. 4 is a flowchart of a method for determining reachability of a terminal group according to a third embodiment of the disclosure.

FIG. 4 is a flowchart of a method for determining reachability of a terminal group according to a third embodiment of the disclosure. As shown in FIG. 4, the method for determining reachability of a terminal group in this example specifically includes the following steps:

Step 401: Identity information of a terminal group is stored as subscription data of terminals into an HSS.

When a terminal accesses a network, a subscriber of the terminal group subscribes the terminals in the terminal group as terminals with a group characteristic, and a group identity is assigned by an operator for the terminal group and stored as the subscription data of the terminals into the HSS.

Step 402: When a service network element needs to acquire the reachability of the terminal group, the service network element sends a terminal group reachability notification request message to the HSS.

In this example, the service network element is an MTC server.

A multiple-to-one correspondence table between a terminal group identity and HSSs is stored into a local database of the MTC server. When the MTC server needs to acquire the reachability of the terminal group, the MTC server searches for, according to the terminal group identity and from the correspondence table between the terminal group identity and the HSSs stored in the local database, an HSS where the terminal group locates is located. After finding the HSS where the terminal group locates, the MTC server sends the terminal group reachability notification request message to the HSS. The terminal group reachability notification request message includes an address of the MTC server, and a terminal group identity or a terminal group identity set, e.g., an IMSI set.

Step 403: It is determined whether the terminal group to be requested is reachable.

After the terminal group registers to a network, the HSS may store a current serving MME for the terminal group. After the HSS receives the terminal group reachability notification request message, the HSS stores the address of the MTC server, and simultaneously searches for group information of the terminals, including group identities of the terminals and a GRUEI, from locally stored information according to the terminal group identity or the set of terminal identities of terminals in the terminal group reachability notification request message, and locally detects whether a PPF of the representative terminal of the terminal group has been cancelled. If the PPF of the representative terminal of the terminal group has been cancelled, the following Step A (including Step A1, Step A2 and Step A3) is performed; if the PPF of the representative terminal of the terminal group has not been cancelled, the following Step B is performed.

Step A1: The HSS locally sets a GRRP-HSS for the terminal group, and simultaneously searches for a serving MME for the terminal group from the locally stored information according to the terminal group identity or the set of terminal identities of terminals in the request message, and sends the terminal group reachability notification request message to the MME; the terminal group reachability notification request message includes a GRRP-HSS setting indicator.

Step A2: After the MME receives the terminal group reachability notification request message from the HSS, the MME locally sets a GRRP-HSS for the terminal group according to the indicator in the terminal group reachability notification request message, and when locally detecting, according to subscribed group information, that the PPF of the representative terminal of the terminal group has been set, the MME sends a terminal group activity notification massage including a PPF setting indicator to the HSS, and locally cancels the GRRP-HSS corresponding to the terminal group at the same time.

Step A3: After the HSS locally detects that the PPF of the representative terminal of the terminal group has been set or the HSS receives an update location message of the representative terminal of the terminal group, the HSS sends the terminal group activity notification massage to the MTC server to notify the MTC server that the terminal group is reachable, and locally cancels the GRRP-HSS corresponding to the terminal group at the same time.

Step B: The HSS directly sends the terminal group activity notification message to the MTC server to notify the MTC server that the terminal group is reachable.

The reachability of an MTC terminal group can be directly determined according to the technical solutions of the embodiments of the disclosure, so that it is unnecessary to determine the reachability of each terminal in the terminal group separately, thereby saving network processing resources and alleviating network congestion.

The disclosure further discloses a system for determining reachability of a terminal group, including a network element and an HSS, wherein the service network element is configured to, when the service network element needs to acquire the reachability of the terminal group, send a terminal group reachability notification request message to the HSS, wherein the terminal group reachability notification request message comprises information of the terminal group; and the HSS is configured to, when the HSS determines that the terminal group is reachable, notify the service network element that the terminal group is reachable.

The system further includes an MME, configured to: after the MME receives the terminal group reachability notification request message from the HSS, set a terminal Group Reachability Request Parameter (GRRP) locally; and after the MME locally detects an activity event of a representative terminal of the terminal group according to the information of the terminal group, send a terminal group activity notification message to the HSS and locally cancel the terminal GRRP;

wherein the HSS is further configured to: after the HSS receives the terminal group reachability notification request message, set a terminal GRRP locally and forward the terminal group reachability notification request message to the MME; and after the HSS receives an update location message of the representative terminal of the terminal group or the terminal group activity notification message from the MME, determine that the terminal group is reachable, and cancel the terminal GRRP locally.

Alternatively, the system further includes an MME, configured to: after the MME receives the terminal group reachability notification request message from the HSS, When the MME locally detects, according to the information of the terminal group, that a Paging Proceed Flag (PPF) of a representative terminal of the terminal group has not been cancelled, determine that the terminal group is reachable, and notify the HSS that the terminal group is reachable;

wherein the HSS is further configured to, after the HSS receives the notification that the terminal group is reachable, locally cancel the terminal GRRP; or when the MME detects that the PPF of the representative terminal of the terminal group has been cancelled, set a terminal GRRP locally, and after the MME locally detects an activity event of the representative terminal of the terminal group according to the information of the terminal group, send a terminal group activity notification message to the HSS and locally cancel the terminal GRRP;

wherein the HSS is further configured to, after the HSS receives the HSS receives the terminal group activity notification message sent by the MME or the update location message of the representative terminal of the terminal group, determine that the terminal group is reachable, and cancel locally the terminal GRRP; and wherein the HSS is further configured to, after the HSS receives the terminal group reachability notification request message, set a terminal GRRP locally and forward the terminal group reachability notification request message to the MME.

Alternatively, the system further includes an MME, wherein the HSS is further configured to: after the HSS receives the terminal group reachability notification request message, when the HSS locally detects, according to the information of the terminal group, that a PPF of a representative terminal of the terminal group has not been cancelled, determine that the terminal group is reachable; or when the HSS detects that the PPF of the representative terminal of the terminal group has been cancelled, set a terminal GRRP locally, and forward the terminal group reachability notification request message to the MME;

wherein the MME is further configured to: after the MME receives the terminal group reachability notification request message from the HSS, set a terminal GRRP locally, and when the MME locally detects, according to the information of the terminal group, that the PPF of the representative terminal of the terminal group has been set, notify the HSS of the PPF of the representative terminal of the terminal group and locally cancel the terminal GRRP;

wherein the HSS is further configured to: after the HSS locally detects that the PPF of the representative terminal of the terminal group has been set or the HSS receives an update location message of the representative terminal of the terminal group, determine that the terminal group is reachable, and locally cancel the terminal GRRP.

The information of the terminal group includes a terminal group identity and/or a set of terminal identities of terminals in the terminal group, and the service network element is an IP-SM-GW, an MTC-IWF entity or an MTC server.

The representative terminal of the terminal group is designated by an operator, or is agreed by an MTC subscriber and the operator.

The activity event of the representative terminal of the terminal group includes that: a terminal sends an attach request message when initiating a network attach process, or that an S-GW notifies the MME that the terminal is handed over to a non-3GPP system.

Those skilled in the art should understand that the system for determining reachability of a terminal group of the disclosure is implemented based on the structure of an existing network composed of MTC terminals by upgrading and improving the functions of some network element thereof, without changing the structure of the network composed of MTC terminals. The disclosure only elaborates functions corresponding to the improved network elements. Other functions of network elements in the network structure or functions of other network elements are the same with functions of corresponding network elements in the existing network composed of MTC terminals, which are not repeated here.

The above are only preferred embodiments of the disclosure, and are not intended to limit the scope of protection of the claims of the disclosure.

INDUSTRIAL APPLICABILITY

In the disclosure, by storing group identity information of an MTC terminal group in an HSS and setting a representative terminal in the MTC terminal group and the like, a service-related network element may initiate a request for acquiring reachability of the terminal group to the HSS through the group identity information, and the HSS, or the HSS and an MME inquire(s), according to the group identity information of the MTC terminal group, whether the representative terminal in the MTC terminal group is reachable, so as to determine whether the whole MTC terminal group is reachable.

The invention claimed is:

1. A method for determining reachability of a terminal group, comprising:

when a service network element needs to acquire the reachability of the terminal group, sending, by the service network element, a terminal group reachability notification request message to a Home Subscriber Server (HSS), wherein the terminal group reachability notification request message comprises information of the terminal group; and when the HSS determines that the terminal group is reachable, notifying, by the HSS, the service network element that the terminal group is reachable;

wherein the operation that the HSS determines that the terminal group is reachable comprises:

after the HSS receives the terminal group reachability notification request message, the HSS sets a terminal Group Reachability Request Parameter (GRRP) locally, and forwards the terminal group reachability notification request message to a Mobility Management Entity (MME); and after the MME receives the terminal group reachability notification request message from the HSS, when the MME locally detects, according to the information of the terminal group, that a Paging Proceed Flag (PPF) of a representative terminal of the terminal group has not been cancelled, the MME determines that the terminal group is reachable, and the MME notifies the HSS that the terminal group is reachable; and after the HSS receives the notification that terminal group is reachable, the HSS cancels the terminal GRRP locally; or when the MME detects that the PPF of the representative terminal of the terminal group has been cancelled, the MME sets the terminal GRRP locally, and after the MME locally detects an activity event of the representative terminal of the terminal group according to the information of the terminal group, the MME sends a terminal group activity notification message to the HSS and locally cancels the terminal GRRP; and after the HSS receives an update location message of the representative terminal of the terminal group or the terminal group activity notification message from the MME, the HSS determines that the terminal group is reachable, and the HSS cancels the terminal GRRP locally.

2. The method according to claim 1, wherein the operation that the HSS determines that the terminal group is reachable comprises:

after the HSS receives the terminal group reachability notification request message, the HSS sets the terminal GRRP locally, and forwards the terminal group reachability notification request message to the MME;

after the MME receives the terminal group reachability notification request message from the HSS, the MME sets the terminal GRRP locally, and after the MME locally detects according to the information of the terminal group the activity event of the representative terminal of the terminal group, the MME sends the terminal group activity notification message to the HSS and locally cancels the terminal GRRP; and after the HSS receives the update location message of the representative terminal of the terminal group or the terminal group activity notification message from the MME, the HSS determines that the terminal group is reachable, and the HSS cancels the terminal GRRP locally.

3. The method according to claim 1, wherein the operation that the HSS determines that the terminal group is reachable comprises:

after the HSS receives the terminal group reachability notification request message, when the HSS locally detects, according to the information of the terminal group, that the PPF of the representative terminal of the terminal group has not been cancelled, the HSS determines that the terminal group is reachable; or when the HSS detects that the PPF of the representative terminal of the terminal group has been cancelled, the HSS sets the terminal GRRP locally, and forwards the terminal group reachability notification request message to the MME; after the MME receives the terminal group reachability notification request message from the HSS, the MME sets a terminal GRRP locally, and when the MME locally detects, according to the information of the terminal group, that the PPF of the representative terminal of the terminal group has been set, the MME notifies the HSS of the PPF of the representative terminal of the terminal group and locally cancels the terminal GRRP; and after the HSS locally detects that the PPF of the representative terminal of the terminal group has been set or the HSS receives the update location message of the representative terminal of the terminal group, the HSS determines that the terminal group is reachable, and the HSS locally cancels the terminal GRRP.

4. The method according to claim 1, wherein the information of the terminal group comprises a terminal group identity and/or a set of terminal identities of terminals in the terminal group, and the service network element is an Internet Protocol-Short Message-Gateway (IP-SM-GW), a Machine Type Communication-Inter Working Function (MTC-IWF) entity or a Machine Type Communication (MTC) server.

5. The method according to claim 1, wherein the representative terminal of the terminal group is designated by an operator or is agreed by an MTC subscriber and the operator.

6. The method according to claim 2, wherein the activity event of the representative terminal of the terminal group comprises that: the representative terminal of the terminal group sends an attach request message when initiating a network attach process, or a Serving GW (S-GW) notifies the MME that the representative terminal of the terminal group is handed over to a non-3rd Generation Partnership Project (3GPP) system.

7. A system for determining reachability of a terminal group, comprising a service network element and a Home Subscriber Server (HSS), wherein the service network element is configured to, when the service network element needs to acquire the reachability of the terminal group, send a terminal group reachability notification request message to the HSS, wherein the terminal group reachability notification request message comprises information of the terminal group; and the HSS is configured to, when the HSS determines that the terminal group is reachable, notify the service network element that the terminal group is reachable;

further comprising a Mobility Management Entity (MME), configured to: after the MME receives the terminal group reachability notification request message from the HSS, When the MME locally detects, according to the information of the terminal group, that a Paging Proceed Flag (PPF) of a representative terminal of the terminal group has not been cancelled, determine that the terminal group is reachable, and notify the HSS that the terminal group is reachable;

wherein the HSS is further configured to, after the HSS receives the notification that the terminal group is reachable, locally cancel a terminal Group Reachability Request Parameter (GRRP); or when the MME detects that the PPF of the representative terminal of the terminal group has been cancelled, set the terminal GRRP locally, and after the MME locally detects an activity event of the representative terminal of the terminal group according to the information of the terminal group, send a terminal group activity notification message to the HSS and locally cancel the terminal GRRP;

wherein the HSS is further configured to, after the HSS receives the HSS receives the terminal group activity notification message sent by the MME or an update location message of the representative terminal of the terminal group, determine that the terminal group is reachable, and cancel locally the terminal GRRP; and wherein the HSS is further configured to, after the HSS receives the terminal group reachability notification request message, set the terminal GRRP locally and forward the terminal group reachability notification request message to the MME.

8. The system according to claim 7, further comprising the MME, configured to: after the MME receives the terminal group reachability notification request message from the HSS, set the terminal GRRP locally; and after the MME locally detects the activity event of the representative terminal of the terminal group according to the information of the terminal group, send the terminal group activity notification message to the HSS and locally cancel the terminal GRRP;

wherein the HSS is further configured to: after the HSS receives the terminal group reachability notification request message, set the terminal GRRP locally and forward the terminal group reachability notification request message to the MME; and after the HSS receives the update location message of the representative terminal of the terminal group or the terminal group activity notification message from the MME, determine that the terminal group is reachable, and cancel the terminal GRRP locally.

9. The system according to claim 7, further comprising the MME, wherein the HSS is further configured to: after the HSS receives the terminal group reachability notification request message, when the HSS locally detects, according to the information of the terminal group, that the PPF of the representative terminal of the terminal group has not been cancelled, determine that the terminal group is reachable; or when the HSS detects that the PPF of the representative terminal of the terminal group has been cancelled, set a terminal GRRP locally, and forward the terminal group reachability notification request message to the MME;

wherein the MME is further configured to: after the MME receives the terminal group reachability notification request message from the HSS, set the terminal GRRP locally, and when the MME locally detects, according to the information of the terminal group, that the PPF of the representative terminal of the terminal group has been set, notify the HSS of the PPF of the representative terminal of the terminal group and locally cancel the terminal GRRP;

wherein the HSS is further configured to: after the HSS locally detects that the PPF of the representative terminal of the terminal group has been set or the HSS receives the update location message of the representative terminal of the terminal group, determine that the terminal group is reachable, and locally cancel the terminal GRRP.

10. The system according to claim 7, wherein the information of the terminal group comprises a terminal group identity and/or a terminal identity set in the terminal group, and the service network element is an Internet Protocol-Short Message-Gateway (IP-SM-GW), a Machine Type Communication-Inter Working Function (MTC-IWF) entity or a Machine Type Communication (MTC) server.

11. The method according to claim 2, wherein the representative terminal of the terminal group is designated by an operator or is agreed by an MTC subscriber and the operator.

12. The method according to claim 3, wherein the representative terminal of the terminal group is designated by an operator or is agreed by an MTC subscriber and the operator.

13. The method according to claim 1, wherein the activity event of the representative terminal of the terminal group comprises that: the representative terminal of the terminal group sends an attach request message when initiating a network attach process, or a Serving GW (S-GW) notifies the MME that the representative terminal of the terminal group is handed over to a non-$3^{rd}$ Generation Partnership Project (3GPP) system.

14. The method according to claim 3, wherein the activity event of the representative terminal of the terminal group comprises that: the representative terminal of the terminal group sends an attach request message when initiating a network attach process, or a Serving GW (S-GW) notifies the MME that the representative terminal of the terminal group is handed over to a non-$3^{rd}$ Generation Partnership Project (3GPP) system.

15. The system according to claim 8, wherein the information of the terminal group comprises a terminal group identity and/or a terminal identity set in the terminal group, and the service network element is an Internet Protocol-Short Message-Gateway (IP-SM-GW), a Machine Type Communication-Inter Working Function (MTC-IWF) entity or a Machine Type Communication (MTC) server.

16. The system according to claim 9, wherein the information of the terminal group comprises a terminal group identity and/or a terminal identity set in the terminal group, and the service network element is an Internet Protocol-Short Message-Gateway (IP-SM-GW), a Machine Type Communication-Inter Working Function (MTC-IWF) entity or a Machine Type Communication (MTC) server.

* * * * *